J. M. HUNT.
HEADLIGHT.
APPLICATION FILED AUG. 16, 1919.
1,407,544.
Patented Feb. 21, 1922.
3 SHEETS—SHEET 1.
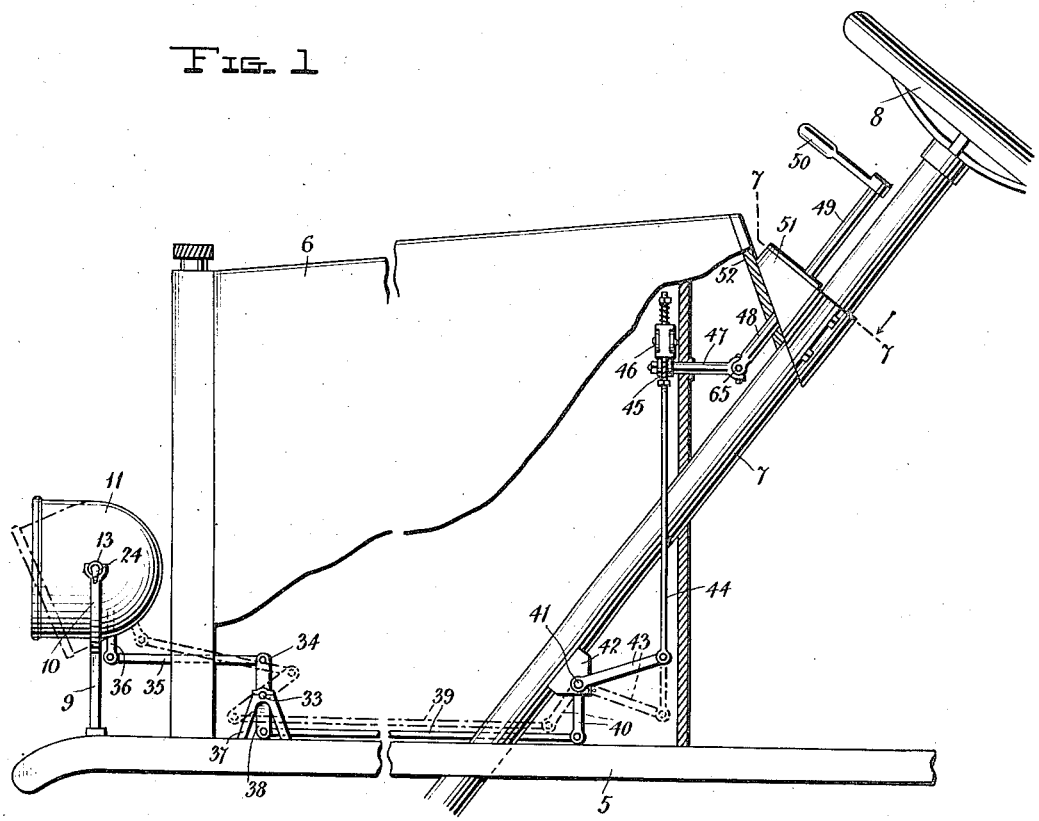
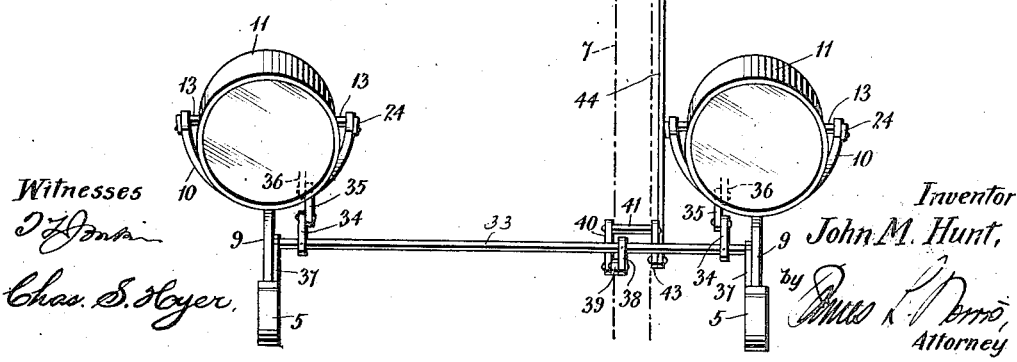
Inventor
John M. Hunt,

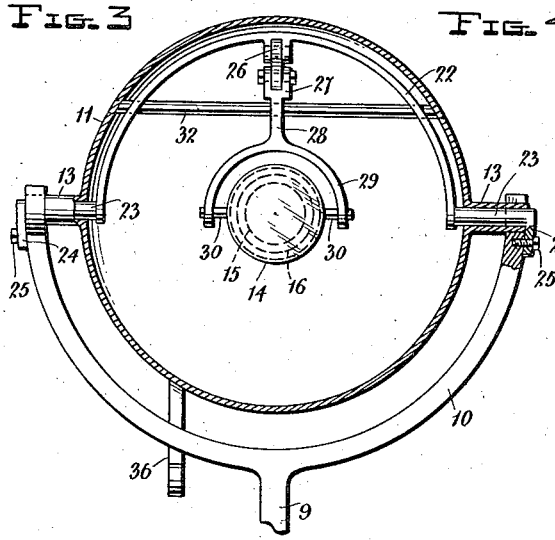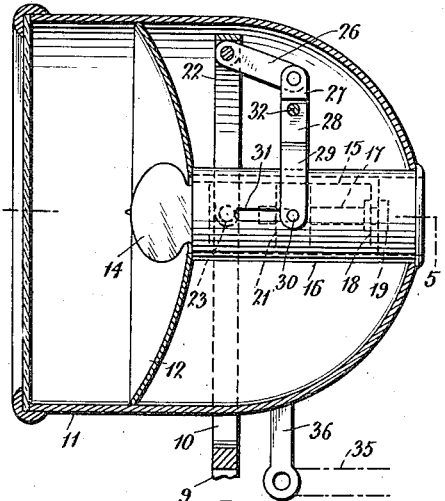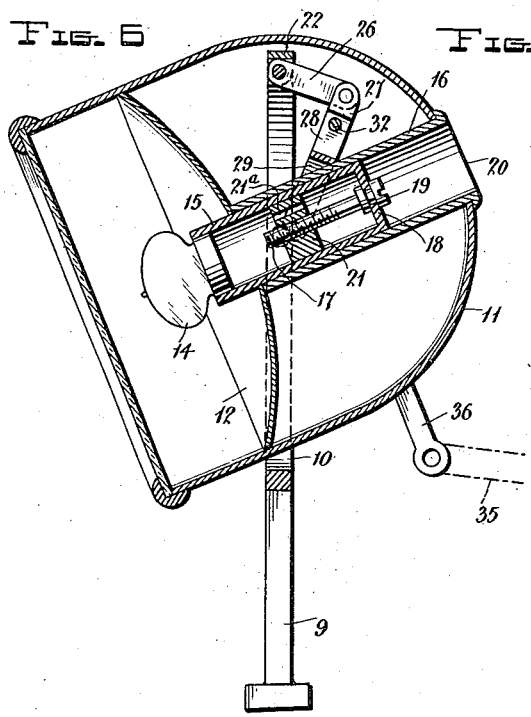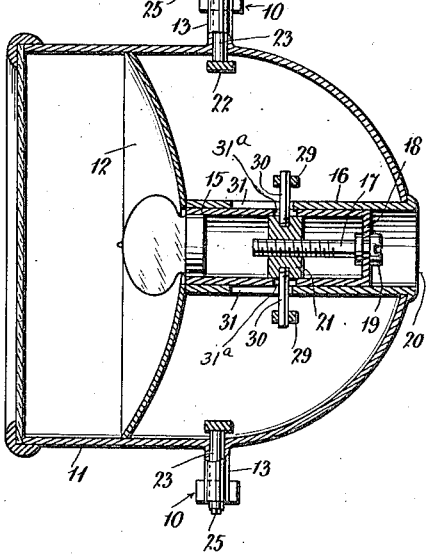

J. M. HUNT.
HEADLIGHT.
APPLICATION FILED AUG. 16, 1919.
1,407,544.
Patented Feb. 21, 1922.
3 SHEETS—SHEET 3.
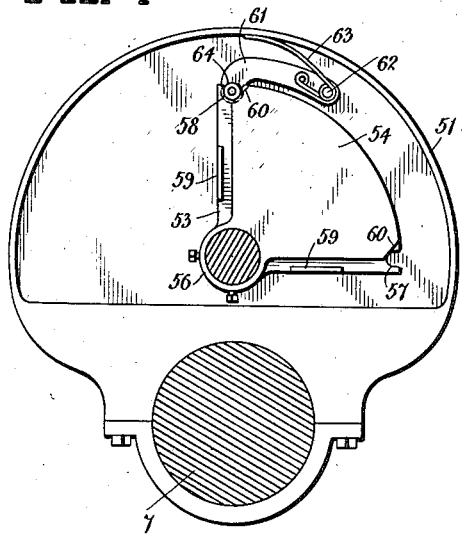
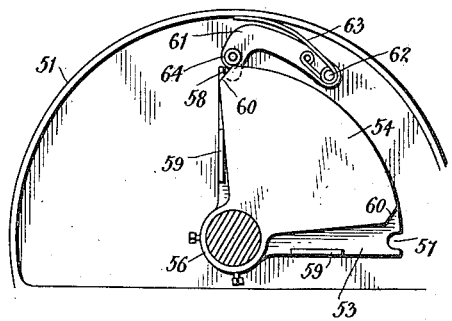
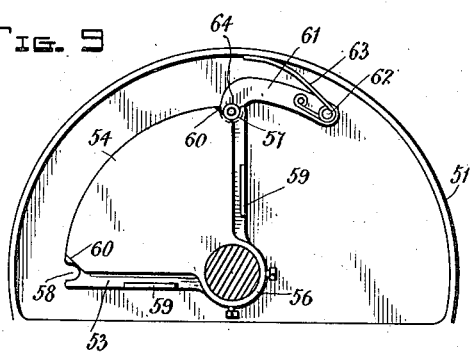
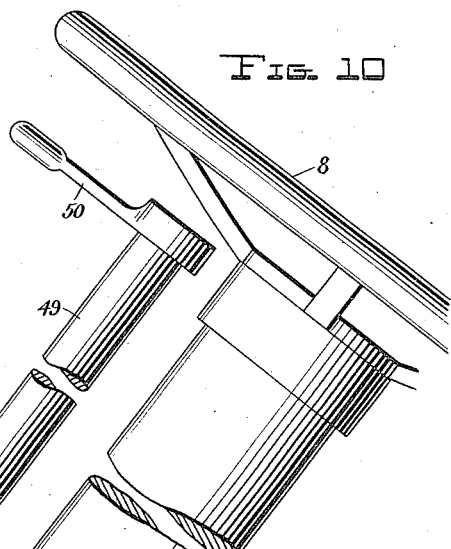
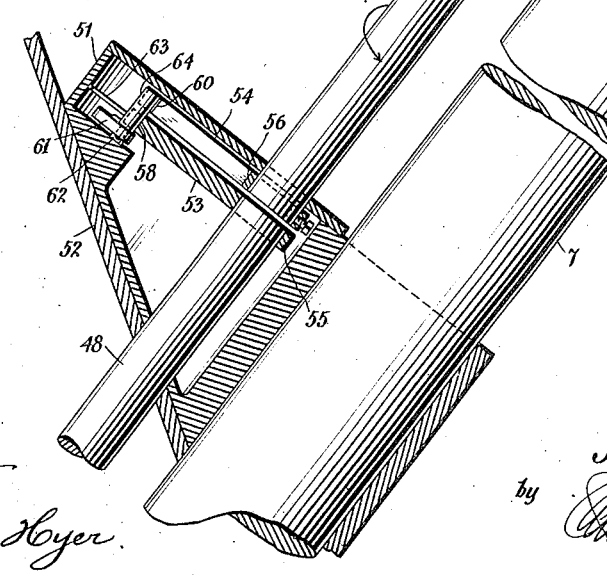
Witnesses
Inventor
John M. Hunt,
by
Attorney.

UNITED STATES PATENT OFFICE.

JOHN M. HUNT, OF CHARLESTON, WEST VIRGINIA.

HEADLIGHT.

1,407,544.  Specification of Letters Patent.  Patented Feb. 21, 1922.

Application filed August 16, 1919. Serial No. 317,941.

*To all whom it may concern:*

Be it known that I, JOHN M. HUNT, a citizen of the United States, residing at Charleston, in the county of Kanawha and State of West Virginia, have invented new and useful Improvements in Headlights, of which the following is a specification.

This invention relates to dirigible headlights, particularly adapted for automobiles, trucks and the like, and the primary object of the invention is to so structurally organize and operatively control a headlight that the focus of the light-producing element may be automatically varied and regulated by a positive shifting movement thereof in opposite directions synchronously with and proportionately to the movement or adjustment of the headlight as a unit for the purpose of producing strong concentrated light rays for long distance vision and widely distributed or diffused light rays for short distance observation of a road or other surface in advance of an automobile or other device on which the improved headlight may be mounted.

With this and other objects and advantages in view, the invention consists in the preferred construction and arrangement of parts hereinafter more fully described and claimed. The accompanying drawings illustrate one organization of structural elements embodying the features of the invention to demonstrate the practicability of automatically varying the focus of the light-producing element of a headlight, but it is proposed to adopt any structure that may be capable of effectively operating to attain the object sought.

In the drawings:

Figure 1 is a sectional side elevation of the front part of an automobile showing the features of the invention applied thereto.

Figure 2 is a front elevation of headlights in skeleton arrangement showing the improved operating mechanism therefor.

Figure 3 is a front sectional elevation of one of the headlights.

Figure 4 is a longitudinal vertical section through the headlight casing, reflector and support therefor and parts of the operating mechanism for automatically shifting the light-producing element, the holder for the latter being illustrated in side elevation.

Figure 5 is a horizontal section taken in the plane of the line 5—5, Figure 4.

Figure 6 illustrates the headlight in longitudinal vertical section in a tilted position or deflected downwardly at an angle and showing the synchronous adjustment or movement of the light-producing element.

Figure 7 is a transverse vertical section taken in the plane of the line 7—7, Figure 1, and illustrating one preferred form of lock for the headlight adjustment.

Figure 8 is a view similar to Figure 7 showing parts of the lock in different positions.

Figure 9 is a view similar to Figure 8 showing parts of the lock in a still different position or overthrown.

Figure 10 is an enlarged longitudinal vertical section of the lock casing and mechanism, together with the means directly associated therewith for operating the same and a portion of the steering post and steering wheel of an automobile, truck or analogous vehicle.

The numeral 5 designates a part of the frame or chassis of an automobile having the ordinary form of motor hood or enclosure 6 mounted thereon. The usual steering post or column 7 extends downwardly and forwardly at an incline through the hood and within the parts of the frame 5, as shown, and is provided with a steering wheel 8 on its upper end. On the forward extremities of the members of the frame 5 are standards 9 for headlight yokes 10 in which headlight casings 11 with reflectors 12 therein are mounted to swing, each of the casings 11 at diametrically opposite points being provided with hollow trunnions 13 extending into and through the upper end of the yokes 10, as clearly shown by Figure 3.

The essential feature of the invention as hereinbefore indicated, consists in simultaneously and synchronously shifting a light-producing element within the headlight casing and relatively to the reflector 12 of each casing proportionately to the movement or angle of adjustment of the said casing. The reflector and the casing 11 are fixed to move as a unit or the reflector does not at any time vary its position within the casing after it has been set or secured in place. As shown for preferred illustration, the light producing means in the present instance is an incandescent electric light having a bulb 14 regularly focused and positioned relatively to the focus of the reflector 12, the said electric bulb being fixed to a slide tube 15 within a stationary tubular holder 16, the said holder being secured to the casing 11 and moving with the latter as a unit. The slide tube 15 also moves with the tube 16 or partakes of the same angle of adjustment as the latter tube and the casing 11 but in addition has an automatic shifting movement in the tube 16 which is effected proportionately to the unitary movement of the casing 11, reflector 12 and tube 16. In addition to its automatic movement, the tube 15 may be primarily adjusted within the tube 16 to provide for the necessary focal range of the light-producing element or bulb 14, this primary adjustment being accomplished through the medium of a screw 17 mounted to rotate in the rear closed end 18 of the tube 15 and having a notched or slotted head 19 exposed through the rear open end 20 of the fixed tube 16 for engagement by a screw driver or similar implement. The screw 17 engages a block 21 fixed in the tube 15 and whereby said latter tube may be adjusted longitudinally of the tube 16 for the purpose specified. Many mechanisms could be used for automatically shifting the tube 15 and the light-producing element carried thereby the desired distance to and from the reflector 12 in accordance with the primal adjustment of the tube 15, it being only necessary to adopt such mechanism as will automatically move the tube 15 and its light-producing element or bulb 14 when the casing 11, reflector 12 and tube 16 fixed to the casing are moved as a unit. As one practical form of mechanism for this purpose, it is proposed to use an arcuate immovable bow or yoke 22 located within the casing behind the reflector 12 and having outwardly projecting terminal arms 23 passed through the tubular trunnions 13 and secured in fixed positions to the outer portions of the upper extremities of each yoke 10 through the medium of an angular flange 24 and suitable screw 25, as shown by Figure 3. By this means the bow 22 is always held in one position within the casing 11 irrespective of the movement of the latter. To the central top portion of the bow 22 the forward end of a link 26 is pivotally connected and extends rearwardly and is also movably attached to the upper bifurcated end 27 of a stem or shank 28 for shifting the yoke 29, shifting pins 30 extending inwardly from the lower ends of the yoke 29 through slots 31 at diametrically opposite points in the fixed tube or holder 16 into the block 21, slots 31ª, (see Figure 5), being also formed in opposite portions of the tube 15 to permit the pins 30 to pass therethrough. Extending across the upper portion of the casing 11 above the plane of the fixed tube or holder 16 and in rear of the fixed bow or yoke 22 is a cross rod 32 which is fixed at its ends in opposite portions of the casing and moves with the latter, and on this cross rod the shifting yoke 29 and its shank 28 have movement, said rod 32 being below the upper bifurcated end 27 of the shank 28. It will be seen that all of the mechanism for directly operating or shifting the tube 15 by the movement of the lamp casing 11 and reflector 12 is located within the said casing in rear of the deflector and is of a comparatively simple structure consisting mainly of the yoke 28, link 26 and bow or yoke 22, together with the connections between the yoke arms and the tube 15 or the pins 30. It is proposed to provide the lamp casing with means for tilting the same at a downward angle and for restoring it to normal position, but this operating means may be varied indefinitely and the function and object desired to be obtained will not be affected, in the least, by a modification of the headlight moving mechanism.

Presuming that any preferred form of headlight-moving mechanism or devices may be used, the operation of the headlight will be as follows: While the headlight is in the position shown by full lines in Figures 1, 3 and 4, the light-producing element or bulb 14 will cast light rays with concentrating effect longitudinally ahead of the automobile or other vehicle on which the headlight is used, all of the parts remaining under such conditions in the position shown by Figure 4. When the light casing is tilted at a downward angle, as shown by dotted lines in Figure 1 and full lines in Figures 2 and 6, it is obvious that as the fixed tube or holder 16 moves upwardly at an angle that the fulcrum rod 32 for the yoke 29 similarly moves and carries the yoke therewith and as a consequence the link 26 which is attached to the fixed yoke 22 is moved upwardly from the position shown by Figure 4 and at the same time the fulcrum rod 32 shifts in an arc towards the plane of the yoke 22 and as this movement ensues a resistance is set up between the rear end of the link attached to the upper end of the shank 28 of the yoke 29 and causes the said latter yoke to swing forwardly on the fulcrum rod 32 a predetermined distance in accordance with the proportions of the parts and by such swinging movement the pins 30 are caused to shift in the slots 31 and at the same time shift the tube 15 forwardly at a predetermined distance in advance of the reflector 12, the latter always remaining fixed as hereinbefore explained. By thus shifting the tube 15 and the light-producing element or bulb 14, the light rays will be distributed or diffused at a point in advance of the automobile on the surface over which the latter may be travelling with material advantages in reliable observation of the roadway or surface and the formation of a spot or circle light will be prevented and a more effective illumination will result in view of the distribution or diffusion. When the casing 11 is restored to normal position, the parts just explained will assume the relationship shown by Figure 4 and the tube 15 with the light-producing element will be drawn rearwardly into the tube 16 for long distance concentration of the light rays.

One preferred means for uniformly operating the headlights consists in mounting a transverse shaft 33 on the frame as particularly shown by Figure 2 and providing said shaft with crank arms 34 attached by connecting rods 35 to arms 36 depending from the headlight casings 11, it being understood that the arms 34 which serve as crank arms are fixed to the shaft 33 and the latter shaft may be conveniently mounted in bearing standards or brackets 37. On the shaft 33 and movable therewith is a depending crank arm 38 to which a connecting rod 39 is secured and extends rearward to a crank arm 40 depending from a short transmission shaft 41 mounted in suitable bearings in the bracket 42 secured to the steering post 7, as shown by Figure 1, the shaft 41 having, in turn, a rearwardly projecting longer crank arm 43 with the lower end of a vertical connecting rod 44 attached thereto and extending upwardly within the rear part of the hood and provided with a snubber spring and attachment 45. This snubber spring and attachment 45 are engaged by and connected to a crank arm 46 on the rear end of a shaft 47 mounted in suitable bearings in a part of the automobile frame as shown by Figure 1 or in the rear of the hood 6, the shaft 47 being a part of the direct actuating shaft or means for the headlight operating mechanism. It will be understood that the crank arms 40 and 43 operate similarly to a bell crank or have the same function as the latter mechanical element and the crank arm 46 will be set at such an angle relatively to the rear end of the shaft 47 as to positively operate the connecting rod 44 to effect the adjustment of the headlight casings either to tilt the latter or to restore them to normal position. The snubber spring and attachment 45 permits the crank arm 46 to describe its arc of movement without binding relatively to the rod 44 and moreover the springs compensate for any loose movement of the connected parts and prevent rattling of said parts. It is obvious that the shaft 47 could be rotated directly by any means that might be applied thereto and produce a practical operation of the headlights in accordance with the features of the invention, but it is preferred that a locking means be used in connection therewith, though said locking means may at times be omitted in a simplified structure of the improvement. The locking means as shown includes a two-part actuating shaft 48 and 49, the part or section 49 having an angular handle 50 attached thereto and located adjacent the steering wheel for convenience in grasping and rotating the shaft sections 49 and 48. The shaft sections 49 and 48 are held in parallel relation to the steering post 7 and reversely extend into a lock casing 51 applied against the dash-board or analogous support 52 of the automobile or any other support of a machine to which the improved mechanism may be applied. The casing 51 has therein two segmental cams 53 and 54, the cam 53 having a hub 55 at its lower angle fixed on the upper end of the shaft section 48, the cam 54 being likewise provided with a hub 56 fixed on the lower end of the shaft section 49. The cam 53 adjacent to the terminal of its periphery is formed with roller seats 57 and 58 and also with flanges 59 projecting a suitable distance from one side and located at the opposite straight edges thereof at intermediate points in relation to the latter. The segmental cam 54 is somewhat smaller than the cam 53 and has the outer corners thereof cut off diagonally or at an angle, as at 60, to provide disengaging faces for a purpose which will be presently explained. Mounted in the casing 51 above the cams 53 and 54 is a lock arm 61 that is fulcrumed at one end as at 62 and engaged by a spring 63 which operates to press the same inwardly towards the cam, the free end of this lock arm carrying a roller 64 which is of such dimensions as to readily move into anl outwardly from the roller seats 57 and 58 at the opposite terminals of the periphery of the cam 53. The operation of this lock is comparatively simple and may be explained as follows: Assuming that the headlight casings 11 are in normal position and it is desired to tilt the same, the handle 50 is drawn inwardly towards the steering post 7, thereby rotating the shaft 49 in the direction of the arrow, shown by Figure 10, and moving the cam 54 to effect a release of the roller 64 from the seat 58 or from the position shown by Figure 7. the said release being effected by the adjacent disengaging face 60 forcing the said roller and arm 61 upwardly against the resistance of the spring 63, the cam 54 continuing to move until the seat is closed and the side edge of the cam nearest the operating disengaging face 60 engages the adjacent flange 59 of the cam 53 and immediately the two cams are rotated as a unit and the shaft 48 similarly turned to actuate the shaft 47 which is connected to the shaft 48 by a universal joint 65. The shaft 47, in turn, actuates the arm 46 and forces the connecting rod 44 downwardly and also the crank arm 43, and through a corresponding movement of the shaft 41 the crank arm 40 is thrown forwardly, as shown by dotted lines in Figure 1, and the connecting rod 39 likewise projected forwardly and turning the shaft 33 through the crank arm 38, the crank arms 34 being through rearwardly and exerting a corresponding pull on and movement of the connecting rods 35 and through the arms 36 the headlight casings are tilted, as shown by dotted lines in Figure 1. When this adjustment has been obtained, the cams 54 and 53 will have moved around a quarter turn within their casing and the roller 64 will then be over the opposite seat recess 57 and immediately be forced into locking engagement with said recess or seat 57 to hold the shaft 49 and 48 and the parts connected to and cooperating therewith against movement and also to prevent the headlights from being modified or accidently displaced from their adjusted position. A reverse movement of the handle 50 and revolution of the shaft 49 will bring the cams 53 and 54 into the position shown by Figure 7 and restore the headlights to normal position. It will be understood that the disengaging faces 60 of the cam 54 will similarly operate in releasing the roller 64 from locking engagement with the respective seats 57 and 58. When the headlights are restored to normal position, as shown in full lines by Figure 1, the cam 53 will become locked and the headlights will thus be maintained against movement from a normal position until a release of the cam 53 is effected in the manner just explained. The form of the operating mechanism for the headlights explained provides for the convenient control thereof at a point adjacent to the driver's seat. This operating mechanism may also be applied to the automobile in any manner best adapted for actuation, but an advantageous location is illustrated in the drawings and consists in passing the shaft or rod 33 through the forward extremity of the hood 6 and dispose the rod 39 in the lower or base portion of the hood to the devices associated therewith in the rear part of the hood. The main connections between the shaft or rod 33 and the headlights also pass into and through the radiator, or between the radiator and the usual fan belt to the crank arms 34. It is obvious that other arrangements may be adopted if desired without modifying the general organization and function of the several elements involved in the operating mechanism.

An electric light producing element or incandescent light 14 has been shown and described in the present instance, the current or feed wires for which will pass through a suitable opening 21ª in the block 21, but it will be understood that the improvements are not restricted to this particular form of light generating or producing means as it is intended to employ any lighting means adapted for the purpose and operable by the mechanism explained to automatically vary the focus thereof by movement of the headlight casing.

I claim:—

1. The combination with a headlight casing mounted to tilt at an angle and having a front glass and a reflector which are both fixed therein, of light producing means in the casing, a yoke held fixed within the headlight casing, and devices cooperating with the light producing means and connected to the fixed yoke for automatically shifting the light producing means to modify the focus of the latter by the movement of the headlight.

2. A tilting headlight comprising a casing mounted to tilt at an angle and having a front glass and a reflector both fixed therein to move as a unit with the casing, a fixed yoke held within the headlight casing and in part projecting exteriorly of the latter, light producing means in the casing and having devices for longitudinally shifting the same relatively to the fixed reflector by and proportionately to the movement of the casing to modify the focus of said light producing means, and connecting means between the said devices and light producing means and yoke.

3. A tilting headlight having a casing and a front glass and reflector all fixed therein and movable as a unit therewith, a shiftable light producing means which is always maintained in the same axial relation to the reflector, means for automatically shifting the light producing means when the headlight is tilted at an angle to a normal upright position, and fixed means extending into the headlight casing and having the means for automatically shifting the light producing means connected thereto.

4. A tilting headlight having a casing with a fixed reflector, light producing means in the casing provided with automatically operating shiftable devices actuated by the movement of the headlight to modify the focus of the light producing means, fixed means extending into the headlight to which the automatically operating shiftable devices for the light producing means is connected, and mechanism operable at a distance from the headlight for controlling the movement of the latter.

5. A tilting headlight having a casing with a reflector fixed therein, light producing means mounted in the casing and provided with devices for automatically operating the same proportionately to the movement of the casing to modify the focus of said light producing means, a fixed yoke in the casing, connections between the fixed yoke and the said devices, and mechanism operable at a distance from the headlight for controlling the movement of the latter and including automatically operating locking means for maintaining the headlight in adjusted position.

6. A tilting headlight having a reflector and an automatically shiftable light producing means therein, and mechanism operable at a distance from the headlight for controlling the movement of the latter and including a locking means comprising a sectional shaft having cams thereon and one provided with opposite projecting means and seats at the opposite terminals of the periphery thereof, the other cam adapted to engage said projecting means and having angular release faces at the opposite terminals of the periphery thereof to coact with said seats, and a spring actuated locking arm and roller automatically operating to engage the seats and movable from the latter by said release faces.

7. A fixed light bracket for an automobile having a tilting headlight mounted therein provided with hollow trunnions engaging the bracket, the headlight being provided with a reflector, a fixed yoke held within the headlight and having terminals extending through said hollow trunnions and secured to the bracket, a light producing means provided with a shiftable tube, connections between the latter tube and the fixed yoke for automatically shifting the tube and light producing means to modify the focus of the latter by the movement of the headlight, and mechanism for moving the headlight.

In testimony whereof I have hereunto set my hand in presence of two subscribing witnesses.

JOHN M. HUNT.

Witnesses:
H. D. MOYER,
JOHN T. MORGAN.